United States Patent [19]
Hyun et al.

[11] Patent Number: 5,726,925
[45] Date of Patent: Mar. 10, 1998

[54] HADAMARD TRANSFORMER USING MEMORY CELL

[75] Inventors: Jin-Il Hyun; Jin-Jong Cha; In Kang, all of Daejeon, Rep. of Korea

[73] Assignee: Electronics and Telecommunications Research Institute, Daejeon, Rep. of Korea

[21] Appl. No.: 557,275

[22] Filed: Nov. 14, 1995

[30] Foreign Application Priority Data

Nov. 23, 1994 [KR] Rep. of Korea .................. 94-30896

[51] Int. Cl.⁶ .................................................. G06F 7/36
[52] U.S. Cl. .................................................. 364/727.01
[58] Field of Search ............................... 364/725–727

[56] References Cited

U.S. PATENT DOCUMENTS

| | | | |
|---|---|---|---|
| 3,795,864 | 3/1974 | Fullton, Jr. | 364/727 |
| 3,859,515 | 1/1975 | Radcliffe, Jr. | 364/727 |

*Primary Examiner*—Tan V. Mai

*Attorney, Agent, or Firm*—Jacobson, Price, Holman & Stern, PLLC

[57] ABSTRACT

A Hadamard transformer is disclosed which uses memory cells in a digital signal processor for restoring to the original signals at a receiving end from the signals which have been transformed to a Hadamard function sequenced at a transmitting end. The Hadamard transformer using memory cells includes a counter which receives sample data clocks to output counted signals to a memory address generator and to a plurality of adder/subtractors. The plurality of adder/subtractors add and subtract the input signals and the data read from a memory in accordance with the counted signals of the counter so as to write or record the results into the memory. The memory address generator generates memory addresses in accordance with the sample data clock and the counted signals so that the memory can be read and written to. The memory thus stores the data inputted and outputted to and from the plurality of sadder/subtractors in accordance with the memory addresses generated by the memory address generator. A comparitor compares the final output values of the adder/subtractors at each period of the Hadamard function sequence so as to detect the maximum likelihood of a Hadamard function sequence.

17 Claims, 7 Drawing Sheets

| 6Address | Adding-subtracting section (1) |
| 5Address 4Address | Adding-subtracting section (2) |
| 3Address 2Address 1Address 0Address | Adding-subtracting section (4) |

HADAMARD TRANSFORMER USING MEMORY CELL

FIELD OF THE INVENTION

The present invention relates to a Hadamard transformer using memory cells (RAM).

DESCRIPTION OF THE PRIOR ART

An orthogonal signal group having an orthogonality is useful to a digital signal modulating method.

Particularly, the Walsh function sequence and the Hadamard function sequence which is transformed from the former have a perfect orthogonality, and therefore, they are currently used in the CDMA expanded band mobile communication system. Further, they are widely used in the digital video processing field, in the digital communication field, and in the digital measuring field.

In the case of a digital signal processor using the Hadamard function sequence, the transmitting signals which have been transformed into the Hadamard function sequence at the transmitting end are restored at the receiving end through the Hadamard transformation.

Prior to describing the present invention, the Hadamard function sequence will be described below.

The Walsh function sequence and the Hadamard function sequence which is transformed from the former have a perfect orthogonality. Owing to this orthogonality, they are useful to the digital signal modulating method.

The Hadamard function has a close relationship to the Walsh function, and in the Walsh matrix, if the sequence of the row is changed, then a Hadamard matrix is formed.

Table 1 shows an example of a Hadamard function sequence in which the column has 8 indices.

In Table 1, "1" and "−1" represent binary signals having values of 1 and −1. Further, the expression of digital signals having values of (0, 1) has a corresponding relations of "1→0" and "−1→1".

TABLE 1

Example of Hadamard function sequence and indices having a sequence length of 8

| Hadamard row index | Walsh row index | Hadamard function sequence |
|---|---|---|
| $I_0 = (000)$ | $W_0 = (000)$ | $h_0 = (1\ \ 1\ \ 1\ \ 1\ \ 1\ \ 1\ \ 1\ \ 1)$ |
| $I_1 = (001)$ | $W_7 = (111)$ | $h_1 = (1\ -1\ \ 1\ -1\ \ 1\ -1\ \ 1\ -1)$ |
| $I_2 = (010)$ | $W_3 = (011)$ | $h_2 = (1\ \ 1\ -1\ -1\ \ 1\ \ 1\ -1\ -1)$ |
| $I_3 = (011)$ | $W_4 = (100)$ | $h_3 = (1\ -1\ -1\ \ 1\ \ 1\ -1\ -1\ \ 1)$ |
| $I_4 = (100)$ | $W_1 = (001)$ | $h_4 = (1\ \ 1\ \ 1\ \ 1\ -1\ -1\ -1\ -1)$ |
| $I_5 = (101)$ | $W_6 = (110)$ | $h_5 = (1\ -1\ \ 1\ -1\ -1\ \ 1\ -1\ \ 1)$ |
| $I_6 = (110)$ | $W_2 = (010)$ | $h_6 = (1\ \ 1\ -1\ -1\ -1\ -1\ \ 1\ \ 1)$ |
| $I_7 = (111)$ | $W_5 = (101)$ | $h_7 = (1\ -1\ -1\ \ 1\ -1\ \ 1\ \ 1\ -1)$ |

In a digital signal processor using the Hadamard function sequence, transmitting signals which have been transformed into Hadamard function sequence at the transmitting end are restored to the original signals through a Hadamard transformation.

A modulating terminal transmits signals by selecting a Hadamard function sequence $H_i$ (corresponding to an index $I_i$) from among the Hadamard row index. Then a demodulating terminal detects a maximum likelihood Hadamard function sequence from among the signals received through the channel, so as demodulate the Hadamard sequence which is the transmitted data.

If the Hadamard function sequence is expressed in the form of a matrix, then it becomes like Formula (0).

$$H_8 = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \quad (0)$$

The Hadmard matrix has a regularity, and a large matrix of it can be derived from small matrices through a repeating procedure.

The regularity and the general formula are shown by Formula 1 below.

$$H_1 = [1] \quad (1)$$

$$H_2 = \begin{pmatrix} H_1 & H_1 \\ H_1 & \overline{H}_1 \end{pmatrix} = \begin{pmatrix} 1 & 1 \\ 1 & -1 \end{pmatrix}$$

$$H_4 = \begin{pmatrix} H_2 & H_2 \\ H_2 & \overline{H}_2 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$H_{2N} = \begin{pmatrix} H_N & H_N \\ H_N & \overline{H}_N \end{pmatrix}$$

Where $\overline{H}_N$ is inverse matrix of $H_N$.

In the case of $H_8$, input signals x(t) and output signals y(t) are taken as an example, and are expressed in the form of matrix. It becomes as shown by Formula (2) below.

$$y_8(t) = \begin{pmatrix} y_0(t) \\ \cdot \\ \cdot \\ \cdot \\ y_7(t) \end{pmatrix} = [H_8] \begin{pmatrix} x(t) \\ \cdot \\ \cdot \\ \cdot \\ x(t-7) \end{pmatrix} = \begin{pmatrix} H_4 & H_4 \\ H_4 & \overline{H}_4 \end{pmatrix} \begin{pmatrix} x(t) \\ \cdot \\ \cdot \\ \cdot \\ x(t-7) \end{pmatrix} \quad (2)$$

Where $\overline{H}_4$ is inverse matrix of $H_4$.

Formula (2) can be expressed like Formula (3) by utilizing the regularity of the general formula (1).

Like Formula (3), Formula (4) can be derived for $H_4$.

$$y_8(t) = \begin{vmatrix} y_0(t) \\ y_1(t) \\ y_2(t) \\ y_3(t) \\ y_4(t) \\ y_5(t) \\ y_6(t) \\ y_7(t) \end{vmatrix} \quad (3)$$

-continued $$
\begin{aligned}
&= \begin{vmatrix} [H_4] \begin{vmatrix} x(t) \\ x(t-1) \\ x(t-2) \\ x(t-3) \end{vmatrix} + [H_4] \begin{vmatrix} x(t-4) \\ x(t-5) \\ x(t-6) \\ x(t-7) \end{vmatrix} \\ [H_4] \begin{vmatrix} x(t) \\ x(t-1) \\ x(t-2) \\ x(t-3) \end{vmatrix} - [H_4] \begin{vmatrix} x(t-4) \\ x(t-5) \\ x(t-6) \\ x(t-7) \end{vmatrix} \end{vmatrix} \\
&= \begin{vmatrix} [H_4] \begin{vmatrix} x(t)+x(t-4) \\ x(t-1)+x(t-5) \\ x(t-2)+x(t-6) \\ x(t-3)+x(t-7) \end{vmatrix} \\ [H_4] \begin{vmatrix} x(t)+x(t-4) \\ x(t-1)+x(t-5) \\ x(t-2)+x(t-6) \\ x(t-3)+x(t-7) \end{vmatrix} \end{vmatrix}
\end{aligned}
$$

$$
y_8(t) = \begin{vmatrix} y_0(t) \\ y_1(t) \\ y_2(t) \\ y_3(t) \end{vmatrix} \quad (4)
$$

$$
= \begin{vmatrix} [H_2]\begin{pmatrix} x(t) \\ x(t-1) \end{pmatrix} + [H_2]\begin{pmatrix} x(t-2) \\ x(t-5) \end{pmatrix} \\ [H_2]\begin{pmatrix} x(t) \\ x(t-1) \end{pmatrix} - [H_2]\begin{pmatrix} x(t-2) \\ x(t-3) \end{pmatrix} \end{vmatrix}
$$

$$
= \begin{vmatrix} [H_2]\begin{pmatrix} x(t)+x(t-2) \\ x(t-1)+x(t-3) \end{pmatrix} \\ [H_2]\begin{pmatrix} x(t)-x(t-2) \\ x(t-1)-x(t-3) \end{pmatrix} \end{vmatrix}
$$

As can be seen in Formulas (1), (2), (3) and (4), the Hadamard function sequence can be calculated by carrying out additions and subtractions based on a 2-divisional method in which the function sequence is folded into halves.

If this method is used, efficient Hadamard transformers can be formed. One of them is the Hadamard transformer using adder-subtractors.

Figure 1:
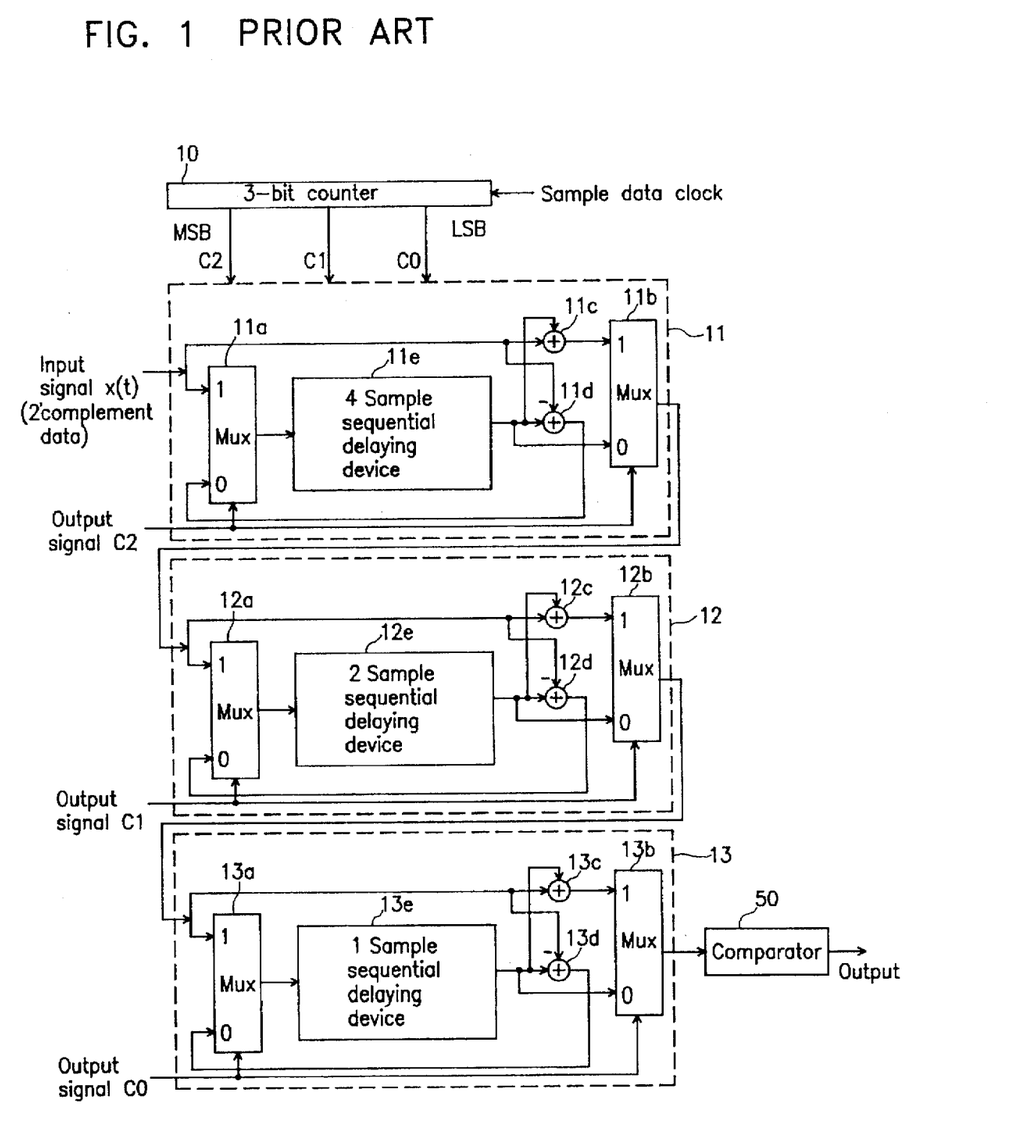
FIG. 1 illustrates one of conventional Hadamard transformers using adder-subtractors.

FIG. 1 illustrates a Hadamard transformer in which adders and subtractors are used for the Hadamard function sequence having a sequence length of 8.

The Hadamard transformer of FIG. 1 includes: a 3-bit counter 10 for receiving signals inputted in accordance with certain counted signals (C2, C1 and C0) of sample data clocks so as to output the signals to a plurality of adding-subtracting sections 11–13; the plurality of the adding-subtracting sections 11–13 outputting a data to sample sequential delaying devices 11e–13e in accordance with the output signals of the 3-bit counter 10, and recording these output data and the results of the adding and subtracting operations for the inputted data into the sample sequential delaying devices 11e–13e; and a comparator 50 for comparing the final output of the adding-subtracting section 13 at each period of the Hadamard function sequence so as to detect the maximum likelihood Hadamard function sequence.

The plurality of the adding-subtracting sections 11–13 includes: switches 11a–13a for selecting and outputting one from among input signals (complementing data for 2) and a subtracted data in accordance with the output signals of the 3-bit counter 10; a 4-sample sequential delaying device 11e, a 2-sample sequential delaying device 12e and one sample sequential delaying device 13e for recording the data selected by the switches 11a–13a; adders 11c–13c for adding up the data recorded in the sample sequential delaying devices; subtractors 11d–13d for subtracting input signals from the data recorded in the sample sequential delaying devices to input them into the switches 11a–13a; and switches 11b–13b for selecting one from among the output data of the adders 11c–13c and the output data of the sample sequential delaying devices 11e–13e in accordance with the counted signals of the 3-bit counter 10.

The adding-subtracting sections 11–13 constituted as described above are operated in the following manner.

First, if the output signals C2, C1 and C0 of the 3-bit counter 10 are high ("1"), the input signals x(t) (input data sequence or the Hadamard function sequence) and the outputs of the sequential delaying devices 11e–13e are outputted through the adders 11c–13c and the switches 11b–13b. Further, the input signals x(t) are subtracted from the outputs of the sequential delaying devices so as to be stored in the sequential delaying devices.

On the other hand, if the counted output signals C2, C1 and C0 of the 3-bit counter 10 is low, the input signals x(t) (Hadamard function sequence) are stored into the sequential delaying devices in the sequential manner, while the data which have been stored in the sequential delaying devices (i.e., the data already subtracted) are outputted through the switches 11b–13b in the sequential manner.

Ultimately, the output of the adding-subtracting section 13 is inputted into the comparator 50.

Meanwhile, the comparator 50 compares the values of the final data which are outputted at each period of the Hadamard function sequence, so as to detect the maximum likelihood Hadamard function sequence.

Therefore, the position at which the maximum likelihood Hadamard function sequence is detected corresponds to the indices of the Hadamard matrix.

When a Hadamard transformer is formed by using the adder-subtractor, many sequential delaying devices are required correspondingly with the number of the adder-subtractors.

Figure 2A:
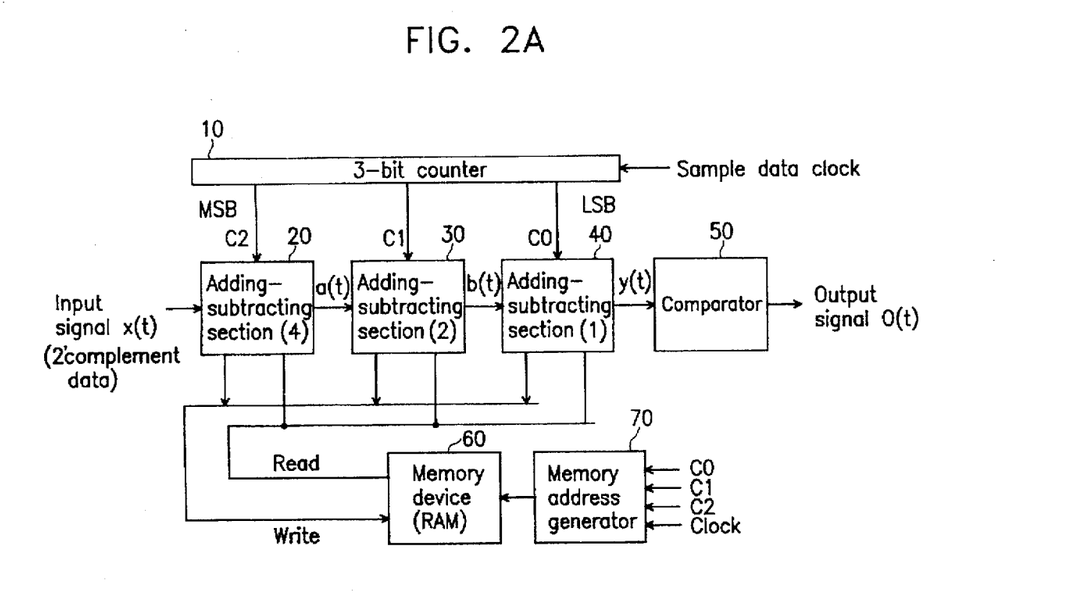
FIGS. 2A and 2B illustrate an embodiment of the Hadamard transformer using a memory device according to the present invention.

FIG. 2 illustrates the number of the sequential delaying devices (e.g., shifter registers).

TABLE 2

Number of shifter registers required
for Hadamard transformer using adder-subtractors

| Size of sequence | Number of shifter registers | |
|---|---|---|
| | 1-bit input data | 16-bit input data |
| $H_{16}$ | 15 | 15 × 16 |
| $H_{32}$ | 31 | 31 × 16 |
| $H_{64}$ | 63 | 63 × 16 |
| $H_{128}$ | 127 | 127 × 16 |
| $H_{256}$ | 255 | 255 × 16 |

As shown in Table 2 above, more serious problems are generated in the number of the sequential delaying devices, as the size of the Hadamard function sequence becomes larger, and as the number of the bits of the input data becomes larger.

When the Hadamard transformer using adder-subtractors is formed into an IC, the proportion occupied by the sequential delaying devices is about 70–95%.

That is, when the Hadamard transformer is formed into an IC, the sequential delaying devices occupy the most area of the chip, with the result that stepping up the chip into a higher density is impeded. When a plurality of transformers are formed simultaneously, more serious problems are encountered.

SUMMARY OF THE INVENTION

The present invention is intended to overcome the above described disadvantages of the conventional technique.

Therefore it is the object of the present invention to provide a Hadamard transformer using memory cells, in which the density is high, and a plurality of the Hadamard transformers can be formed.

In achieving the above object, the Hadamard transformer using memory cells according to the present invention includes: a counting means for receiving sample data clocks to output counted signals to a memory address generating means and to a plurality of adding-subtracting means; the plurality of the adding-subtracting means adding the input signals and the data read from a memory means and subtracting the former from the latter in accordance with the counted signals of the counting means so as to record the results into the memory means; the memory address generating means generating memory addresses in accordance with the sample data clock and in accordance with the counted signals of the counting means so as to make it possible to record and read to and from the memory means; the memory means storing the data inputted and outputted to and from the plurality of the adding-subtracting means in accordance with the memory addresses generated by the memory address generating means; and a comparing means for comparing the final output values of the adding-subtracting means at each period of the Hadamard function sequence so as to detect the maximum likelihood Hadamard function sequence, whereby, during a digital communication, the signals modulated into a Hadamard function sequence at the transmitting end can be demodulated at the receiving end with a simple constitution of a circuit.

In another aspect of the present invention, a plurality of transformers can be formed in an efficient manner by using only a single memory means.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

FIG. 2A illustrates a preferred embodiment of the Hadamard transformer using a memory device according to the present invention.

As shown in FIG. 2A, the Hadamard transformer according to the present invention includes: a 3-bit counter (an octonal counter) 10 for receiving sample data clocks to output counted signals C0, C1 and C2 to a memory address generator 70 and to first to third adding-subtracting sections 20, 30 and 40; the first to third adding-subtracting sections 20, 30 and 40 adding the input signals (a Hadamard function sequence as 2' complementing data) and the data read from a memory device 60 and subtracting the former from the latter in accordance with the counted signals of the 3-bit counter 10 so as to record the results into the memory device 60; the memory address generator 70 generating memory addresses in accordance with the sample data clocks and the counted signals of the 3-bit counter 10 so as to make it possible to record and read to and from the memory device 60; the memory device 60 storing the data inputted (i.e., input signals x(t), a(t) and b(t)) and outputted to and from the first to third adding-subtracting sections 20, 30 and 40 in accordance with the memory addresses generated by the memory address generator 70; and a comparator 50 for comparing the final output values of the third adding-subtracting section 40 at each period of the Hadamard function sequence so as to detect the maximum likelihood Hadamard function sequence.

Figure 8:
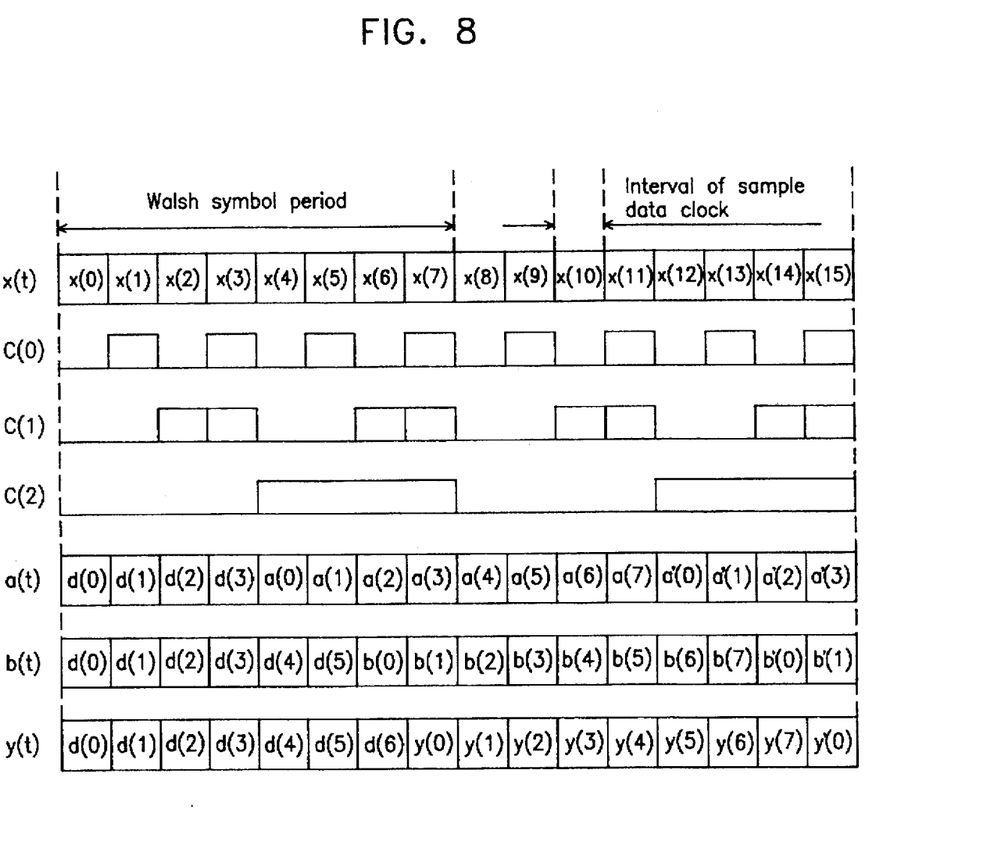
FIG. 8 illustrates the wave patterns for the respective portions of FIG. 2.

In the above, the 3-bit counter 10 is an octonal counter, and receives sample data clocks to output outputs C0, C1 and C2 as shown in FIG. 8 (C0, C1, C2).

Further, the size of the memory device 60 which is used in the present invention is as shown in $H_8$ of Table 3 below.

Figure 2B:
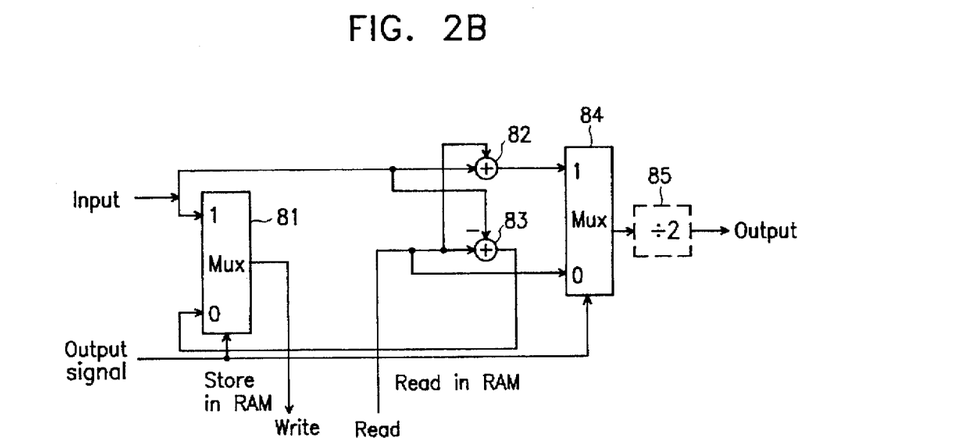

As shown in FIG. 2B, each of the adding-subtracting sections includes: a first switch 81 for selectively recording into the memory device 60 a subtracted output data or the data inputted in accordance with the output signals of the 3-bit counter 10; a second switch 84 for selectively outputting to a divider 85 the data read from the memory device 60 or the data of the memory device 60 plus the input data in accordance with the counted output signals of the 3-bit counter 10; an adder 82 for adding up the inputted data and the data read from the memory device 60 so as to output the results to the second switch 84; a subtractor 83 for subtracting the inputted data from the data read from the memory device 60 to output the results to the first switch 81; and a divider 85 for dividing the output values of the second switch 84 so as to adjust the number of the digits of the effective data during the digital signal processing.

In such a constitution, the first and second switches 81 and 84 may use a multiplexer Mux for changing the flow of the signals in accordance with the output signals of the counter.

Further, the divider 85 shifts the added and subtracted data by 1 bit rightward for adjusting the number of the digits of the effective data during the digital signal processing. Under this condition, if there is no limit in the number of the digits, the digit adjusting operation may be skipped.

Figure 3:
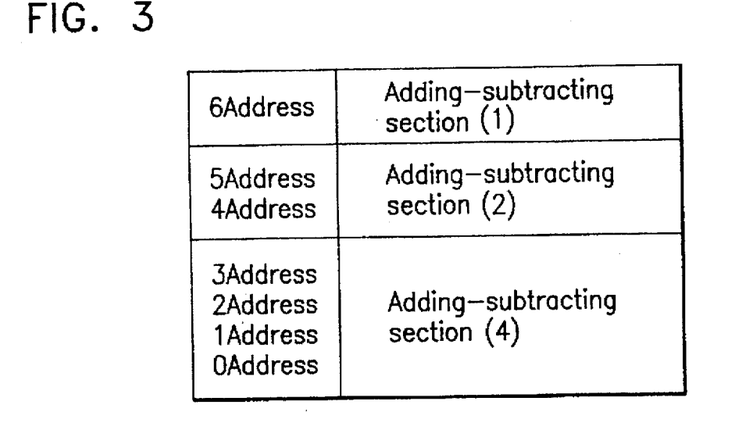
FIG. 3 illustrates the assignment of addresses on the memory device.

FIG. 3 illustrates the assignment of addresses in the memory device.

Generally, the assignment of addresses in the memory device is carried out by taking into account the constitution of the adding-subtracting sections and the easiness of the generation of addresses.

Figure 4:
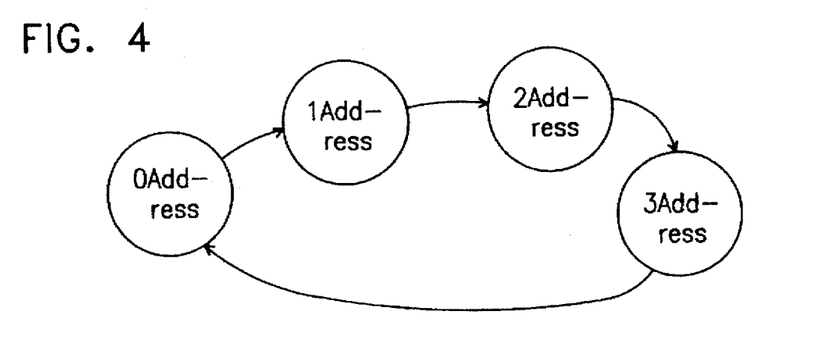
FIGS. 4 to 6 illustrate shifting of addresses for the adding-subtracting means.
Figure 5:
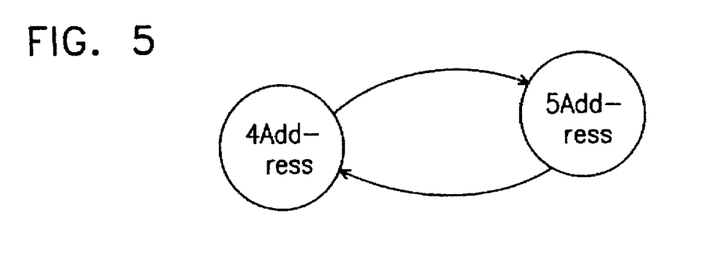
Figure 6:
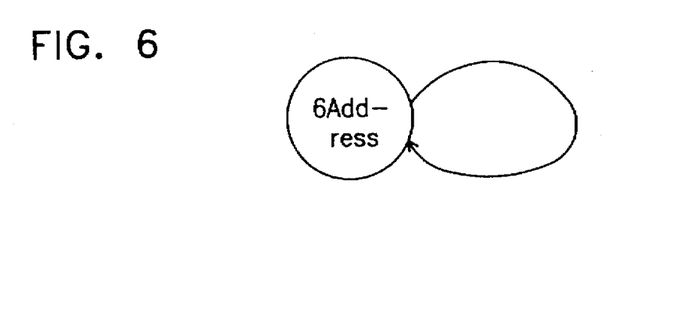

The address shifting of the memory address generator 70 is carried out in the following manner. That is, as shown in FIG. 4, for addresses assigned to the first adding-subtracting section 20, the address shifts 0→1→3→0. As shown in FIG. 5, the address assigned to the second adding-subtracting section 30 shifts 4→5→4. Further, as shown in FIG. 6, the address assigned to the third adding-subtracting section 40 shifts 6→6.

Such address shifts can be realized in an easy manner by utilizing the sample data clocks and the outputs C0, C1 and C2 of the 3-bit counter 10. In another embodiment of the present invention, the address shifts can be realized in an easy manner by utilizing the sample data clocks and I/N sample data clocks.

The first embodiment of the present invention constituted as above will now be described as to its operations.

Figure 7:
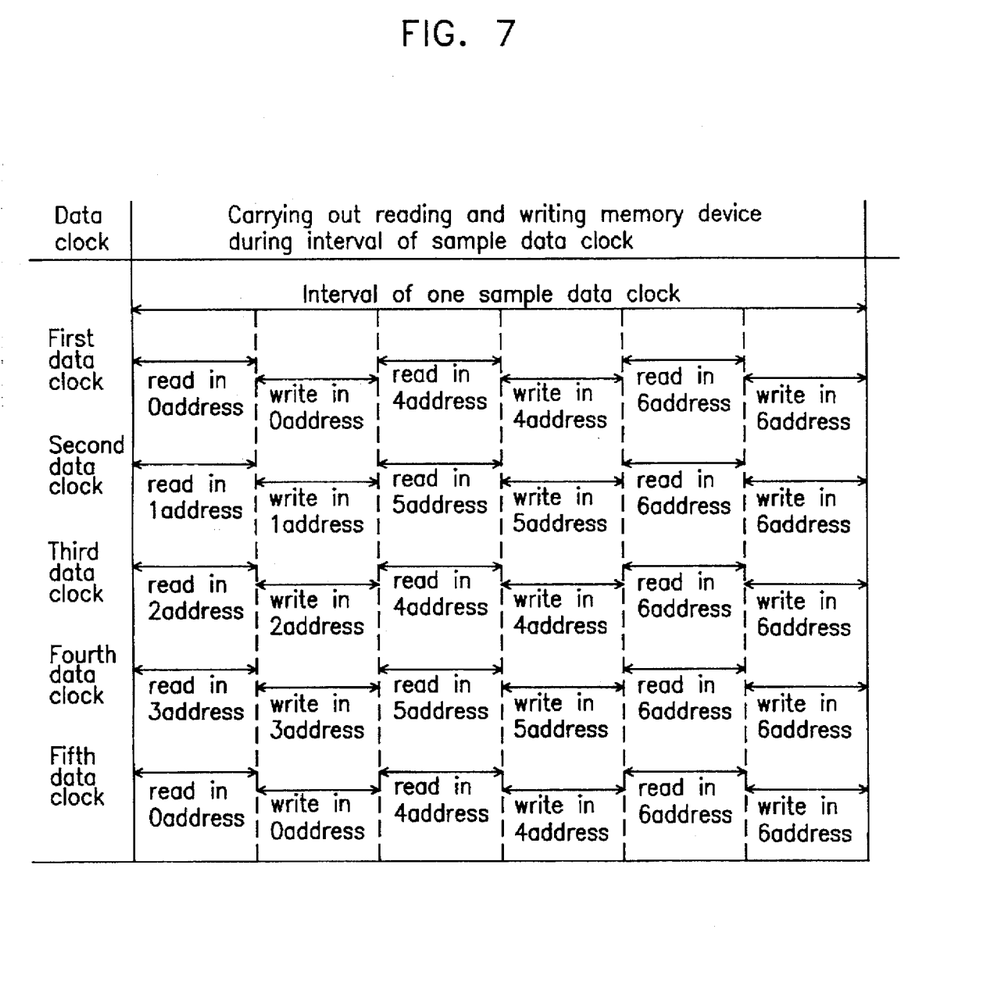
FIG. 7 illustrates the operation of the memory device within the interval of a sample data clock.

FIG. 7 illustrates the operation of the memory device 60 during the interval of a sample data clock.

The memory address generator 70 is so constituted as to supply addresses which are suitable to the operation of the memory device 60.

As shown in FIG. 7, during the interval of one sample data clock, the memory device 60 carries out one reading and one writing for the first adding-subtracting section 20 on address 0, address 1, address 2 and address 3 in the sequential manner. Further, the memory device 60 carries out one reading and one writing for the second adding-subtracting section 30 on address 4 and address 5. Further, the memory device 60 carries out one reading and one writing for the third adding-subtracting section 40 on address 6.

Further, during the interval of one sample data clock, the memory device 60 carries out reading and writing as many times as the number of the adding-subtracting sections as shown in Formula 7.

Further, the memory address generator 70 carries out address shifts in accordance with the assignment of addresses to the adding-subtracting sections as shown in FIGS. 4, 5 and 6.

Accordingly, the memory device 60 carries out reading and writing correspondingly with the number of the adding-subtracting sections.

FIG. 8 illustrates the wave patterns for the respective portions of FIG. 2.

Referring to FIG. 8, x(t) indicates the input signals of FIG. 2 based on a time variable t. The smaller the time variable, the earlier signal it is.

In this case, the sequence of the data is x(0), x(1), x(2), . . . x(15).

Referring to FIG. 8, a(t) indicates the output of the first adding-subtracting section 20 of FIG. 2 based on a time variable t. The smaller, the time variable, the earlier signal it is.

During the interval of 4 clocks in which the counted output signals C2 of the 3-bit counter 10 is '0', the inputs are stored in the memory device 60 in a sequential manner in accordance with the generation of a 'module path 4 address'. Then data d(0), d(1), d(2) and d(3) are outputted from the memory device 60.

The data D(0), d(1), d(2) and d(3) are the values such that the output signals of the subtractor 83 for the signals earlier than X(0) are selected by the first switch 81, then they are stored in the memory device 60 for a certain period of time, then they are selected by the second switch 84, and then, they are outputted from the divider 85.

Further, during the interval in which the output signals C(2) is '1', the input and the data read from the memory device 60 are added up by the adder 82. The added value is selected by the second switch 84 to be outputted through the divider 85 as a(t).

At the same time, the input is subtracted from the data read from the memory device 60 by the subtractor 83. The results are sequentially stored in the memory device for a certain period of time, and they are outputted as a(t) during the interval in which C(2) is '0'.

The a(t) thus outputted is inputted into the second adding-subtracting section 30.

Under this condition, the use of the divider 85 may be skipped in the case where there is not limit in the number of digits.

At a(t), if the output after the 4 sample clocks is expressed in x(t), it becomes as follows.

$$a(0)=x(0)+x(4)$$

$$a(1)=x(1)+x(5)$$

$$a(2)=x(2)+x(6)$$

$$a(3)=x(3)+x(7)$$

$$a(4)=x(0)-x(4)$$

$$a(5)=x(1)-x(5)$$

$$a(6)=x(2)-x(6)$$

$$a(7)=x(3)-x(7)$$

$$a'(0)=x(8)+x(12)$$

$$a'(1)=x(9)+x(13)$$

$$a'(2)=x(10)+x(14)$$

$$a'(3)=x(11)+x(15)$$

Referring to FIG. 8, b(t) indicates the output of the second adding-subtracting section 30 of FIG. 2 based on a time variable t. The smaller the time variable, the earlier the signal is.

During the interval of 2 clocks in which the counted output signals of the 3-bit counter 10 is '0', the input signals are sequentially stored in the memory device 60 for a certain period of time in accordance with the address generation of a 'module path 2' of FIG. 5. Then the data d(4) and d(5) which have been stored in the memory device 60 are outputted.

The data d(4) and d(5) indicate the values such that the output signals of the subtractor 83 for the signals preceding x(0) are selected by the first switch 81, then they are stored in the memory device 60 for a certain period of time, and then, they are outputted through the divider 85.

Meanwhile, during the interval in which the C(1) is '1', the input signals and the output signals of the memory device 60 are added up by the adder 82. The added results are selected by the second switch 84 so as to be outputted through the divider 85 as b(t).

At the same time, the input is subtracted from the output of the memory device 60, and then, the subtracted values are sequentially stored in the memory device 60 for a certain period time. Then during the interval in which C(1) is '0', the b(t) which is the divided result is outputted through the divider 85.

The output b(t) is inputted into the third adding-subtracting section 40.

Under this condition, the use of the divider 85 may be skipped, if there is no limit in the number of the digits.

Accordingly, the outputs b(t) after the 6 sample clocks can be expressed in the form of x(t) as follows.

$b(0)=a(0)+a(2)=x(0)+x(4)+x(2)+x(6)$ $b(1)=a(1)+a(3)=x(1)+x(5)+x(3)+x(7)$ $b(2)=a(0)-a(2)=x(0)+x(4)-x(2)-x(6)$ $b(3)=a(1)-a(3)=x(1)+x(5)-x(3)-x(7)$ $b(4)=a(4)+a(6)=x(0)-x(4)+x(2)-x(6)$ $b(5)=a(5)+a(7)=x(1)-x(5)+x(3)-x(7)$ $b(6)=a(4)-a(6)=x(0)-x(4)-x(2)+x(6)$ $b(7)=a(5)-a(7)=x(1)-x(5)-x(3)+x(7)$ $b'(0)=a'(0)+a'(2)=x(8)+x(12)+x(10)+x(14)$ $b'(1)=a'(1)+a'(3)=x(9)+x(13)+x(11)+x(15)$

The y(t) of FIG. 8 is an expression of the output of the third adding-subtracting section 40 based on a time variable t as shown in FIG. 2A. The smaller the time variable, the earlier the signal is.

During the interval of one clock in which the counted output signals C(0) of the 3-bit counter 10 are '0', the inputs are sequentially stored in the memory device 60 for a certain period of time in accordance with the generation of a 'module path 1' of FIG. 6, and the stored data d(6) which have been stored in the memory device 60 are outputted.

The data d(6) indicates output values such that the output of the subtractor 83 for the signals earlier than x(0) is stored in the memory device 60, and then, the stored data are outputted through the second switch 84 and the divider 85.

Meanwhile, during the interval of one clock in which C(0) is '1', the output signals of the memory device 60 and the input signals are added together by the adder 83. Then the added results are selected by the second switch 84 so as to be outputted through the divider 85 as y(t).

At the same time, the input is subtracted from the output of the memory device 60, and the subtracted results are selected by the first switch 81 so as to be sequentially stored in the memory device 60 for a certain period of time. Then in the interval in which the next C(0) is '0', the data are outputted through the divider 85 as y(t).

At y(t), the outputs after 7 sample clocks can be expressed in the form of x(t) as follows.

$y(0) = b(0) + b(1) =$ $x(0) + x(1) + x(2) + (x3) + x(4) + x(5) + x(6) + x(7)$ $y(1) = b(0) - b(1) =$ $x(0) - x(1) + x(2) - x(3) + x(4) - x(5) + x(6) - x(7)$ $y(2) = b(2) + b(3) =$ $x(0) + x(1) - x(2) - x(3) + x(4) + x(5) - x(6) - x(7)$ $y(3) = b(2) - b(3) =$ $x(0) - x(1) - x(2) + x(3) + x(4) - x(5) - x(6) + x(7)$ $y(4) = b(4) + b(5) =$ $x(0) + x(1) + x(2) + x(3) - x(4) - x(5) - x(6) - x(7)$ $y(5) = b(4) - b(5) =$ $x(0) - x(1) + x(2) - x(3) - x(4) + x(5) - x(6) + x(7)$ $y(6) = b(6) + b(7) =$ $x(0) + x(1) - x(2) - x(3) - x(4) - x(5) + x(6) + x(7)$ $y(7) = b(6) - b(7) =$ $x(0) - x(1) - x(2) + x(3) - x(4) + x(5) + x(6) - x(7)$ $y'(0) = b'(0) + b'(1) =$ $x(8) + x(9) + x(10) + x(11) + x(12) + x(13) + x(14) + x(15)$ $y'(1) = b'(0) - b'(1) x(8) -$ $x(9) + x(10) - x(11) + x(12) - x(13) + x(14) - x(15)$

The output of y(t) can be expressed in the form of a matrix like Formula 5.

The middle portion of the matrix in Formula 5 is same as Formula 0, and Formula 5 can be expressed in the form of a matrix like Formula 6.

From Formulas 5 and 6, it can be known whether the operation of the Hadamard transformer is correct.

$$y(t) = \begin{vmatrix} y(0) \\ y(1) \\ y(2) \\ y(3) \\ y(4) \\ y(5) \\ y(6) \\ y(7) \end{vmatrix} = \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix} \begin{vmatrix} x(0) \\ x(1) \\ x(2) \\ x(3) \\ x(4) \\ x(5) \\ x(6) \\ x(7) \end{vmatrix}$$ (5)

$$y(t)=[H_8]x(t) \quad (6)$$

The comparator 50 of FIG. 2A compares the output value y(t) of the third adding-subtracting section 40 at each period of the Hadamard function sequence so as to detect the maximum likelihood Hadamard function sequence. The position at which the maximum value is detected corresponds to the indices of the Hadamard matrix.

Referring to FIG. 8, the comparing interval is y(0), ..., y(7). If the comparison is made by delaying y(t) by one clock, then the indices of the Hadamard matrix can be obtained in which the maximum value-detected position corresponds to the value of the 3-bit counter 10.

The indices of the Hadamard matrix are detected by the Hadamard transformer after one Hadamard function sequence period from the time when the Hadamard function sequence is inputted.

In a Hadamard transformer using adding-subtracting sections, the number of the adding-subtracting sections is decided by the length of the hadamard function sequence. That is, the number of adding-subtracting sections required is decided based on Formula 7.

$$\text{Length of Hadamard function sequence} = 2^N \quad (7)$$

where N indicates the number of the adding-subtracting sections required.

The size of memory device required in a Hadamard transformer is shown in Table 3 below.

TABLE 3

Size of memory device required in a Hadamard transformer

| Size of function sequence | Size of memory device required (Unit: bit) | |
|---|---|---|
| | Input of 1 bit | Input of 16 bits |
| $H_8$ | 7 | 7 × 16 |
| $H_{16}$ | 15 | 15 × 16 |
| $H_{32}$ | 31 | 31 × 16 |
| $H_{64}$ | 63 | 63 × 16 |
| $H_{128}$ | 127 | 127 × 16 |
| $H_{256}$ | 255 | 255 × 16 |

As shown in Table 3 above, the size of memory device required is proportional to the size of the function sequence.

Meanwhile, in the digital communication using the Hadamard function sequence, there are cases in which a plurality of Hadamard transformers are required for demodulating the modulated signals (modulated into the Hadamard function sequence at the transmitting end) at the receiving end.

Therefore, when a plurality of Hadamard transformers are simultaneously required, the plurality of the Hadamard transformers may be combined with a single memory. This is achieved in the present invention, and this is illustrated in FIG. 9A as another embodiment of the present invention.

Figure 9A:
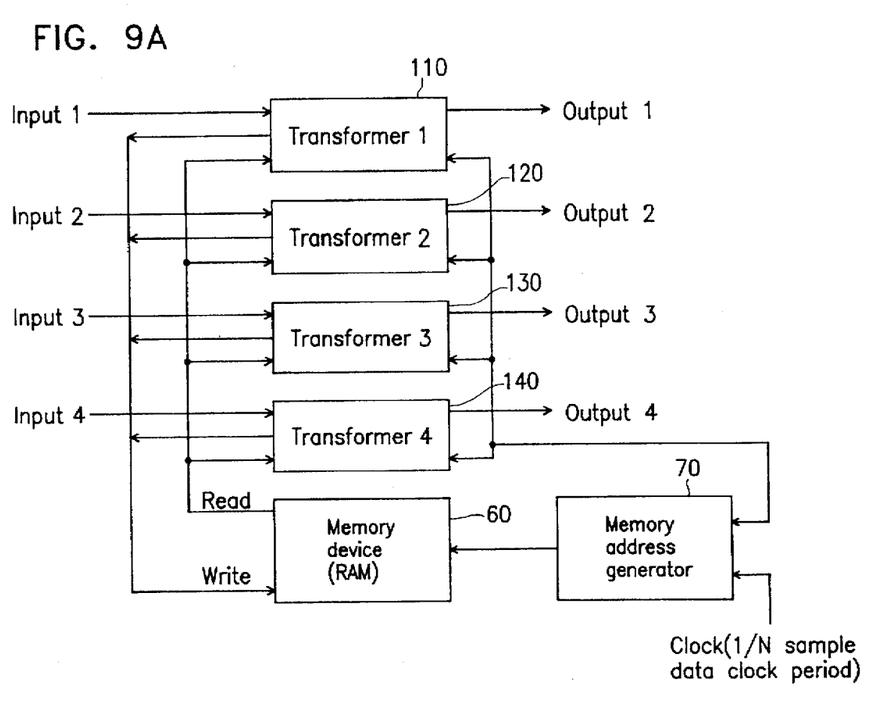
FIGS. 9A to 9C illustrate another embodiment of the Hadamard transformer according to the present invention, in which a plurality of Hadamard transformers are formed by using one single memory device.

FIG. 9A illustrates an example in which there are used four Hadamard transformers having a function sequence length of 8 ($H_8$).

Figure 9B:
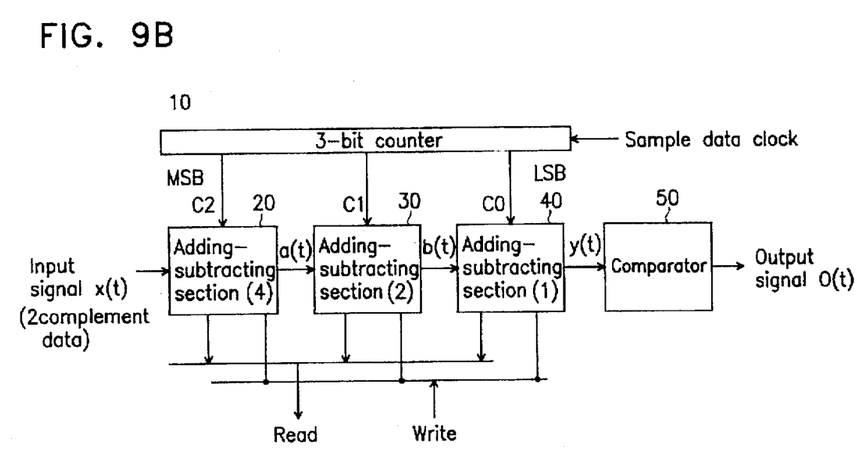
Figure 9C:
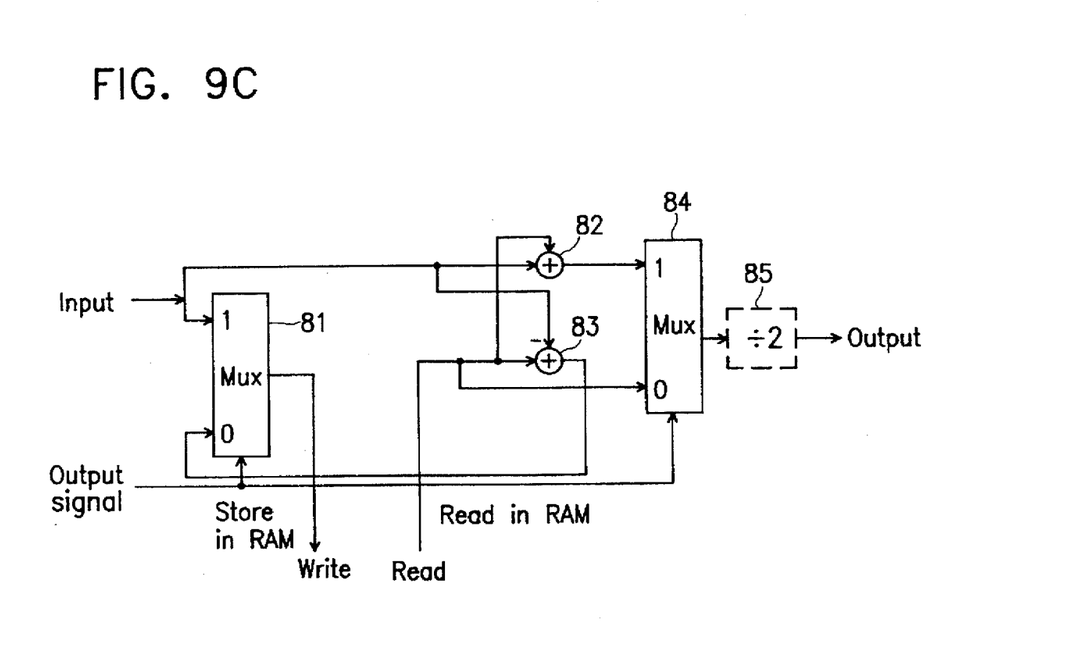

First to fourth transformers 110–140 of FIG. 9A are constituted as shown in FIGS. 9B and 9C. Their constitutions and operations are same as those described referring to FIGS. 2A and 2B.

This second embodiment of the Hadamard transformer according to the present invention includes: a 3-bit counter (an octonal counter) 10 for receiving sample data clocks to output counted signals to a memory address generator 70 and to first to third adding-subtracting sections 20, 30 and 40; the first to third adding-subtracting sections 20, 30 and 40 adding and subtracting the input signals (a Hadamard function sequence as 2' complementing data) and the data read from a memory device 60 in accordance with the counted signals C2, C1 and C0 of the 3-bit counter 10 so as to output an output; a plurality of transformers 110, 120, 130 and 140 each consisting of a comparator for comparing the final output values of the adding-subtracting section 40 at each period of the Hadamard function sequence so as to detect the maximum likelihood Hadamard function sequence; the memory device 60 storing the data inputted and outputted to and from the first to third adding-subtracting sections 20, 30 and 40; and the memory address generator 70 generating memory addresses in accordance with the sample data clocks and 1/N sample data clocks (which are variable by the memory device 60) so as to make it possible to record and read to and from the memory device 60.

The memory device 60 has a capacity of storing the data related to the first to fourth transformers 110–140. Further, 12 rounds of reading and writing, i.e., 3 readings and 3 writings for each transformer are carried out during each sample data clock interval.

That is, during each sample data clock interval, 12 readings and 12 writings are carried out.

In the clock (1/N sample data clock period) which is used in the memory address generator 70, 'N' is a variable number which is variable in accordance with the memory device used, and it means a clock having a frequency which is capable of carrying out a sufficient memory operation.

Therefore, the first transformer 110 carries out 3 readings and 3 writings during one sample data clock interval. In the same way, the second, third and fourth transformers 120, 130 and 140 carry out 3 readings and 3 writings from and to the memory device 60.

That is, the operation of the memory device 60 is 4 times that of FIG. 2A.

Under this condition, the respective first adding-subtracting sections 20 which are disposed in the transformers 110–140 carry out one reading and one writing in the sequential manner, and then, the respective second adding-subtracting sections 30 and the respective third adding-subtracting sections 40 carry out one reading and one writing in the same way.

FIG. 9C illustrates the constitutions of the first to third adding-subtracting sections 20, 30 and 40. Their constitutions and operations are same as those of FIG. 2B, and therefore, descriptions thereon will be skipped.

According to the present invention as described above, if the Hadamard transformer is formed into an IC, the structure is simple, and therefore, the chip area and the power consumption can be reduced.

Further, a plurality of Hadamard transformers can be efficiently formed by using a single memory device.

The easiness of the formation of the Hadamard transformer contributes to widening the design width for the Hadamard function sequence, and to improving the performance.

What is claimed is:

1. A Hadamard transformer using memory and a digital signal processor for restoring to original signals at a receiving end from signals transformed to a Hadamard function sequence at a transmitting end, the Hadamard transformer comprising:

a counting means for receiving sample data clocks to output counted signals to a memory address generating means and to a plurality of adding-subtracting means;

the plurality of said adding-subtracting means for adding and subtracting the input signals and the data read from a memory means in accordance with counted signals of said counting means so as to record the results into said memory means;

said memory address generating means for generating memory addresses in accordance with a sample data clock and in accordance with the counted signals of said counting means so as to record to and read from said memory means;

said memory means for storing the data inputted and outputted to and from the plurality of said adding-subtracting means in accordance with memory addresses generated by said memory address generating means; and a comparing means for comparing a final output value of said adding-subtracting means at each period of the Hadamard function sequence so as to detect a maximum likelihood Hadamard function sequence.

2. The Hadamard transformer as claimed in claim 1, wherein said adding-subtracting section comprises:

a first switching section for selectively recording into the memory device a subtracted output data or a data inputted in accordance with output signals of said counting means;

a second switching section for selectively outputting to a dividing section a data read from said memory means or a data of said memory means plus an input data in accordance with counted output signals of said counting means;

an adding section for adding up an inputted data and a data read from said memory means so as to output results to said second switching section;

a subtracting section for subtracting an inputted data from a data read from said memory means to output results to said first switching section; and a dividing section for dividing output values of said second switching section so as to adjust the number of digits of an effective data during a digital signal processing.

3. The Hadamard transformer as claimed in claim 1, wherein said comparing means compares outputs of the plurality of said adding-subtracting means by delaying a clock.

4. The Hadamard transformer as claimed in claim 1, wherein, in said memory means, output data of the plurality of said adding-subtracting means are sequentially stored into addresses of said memory means for a predetermined period of time.

5. The Hadamard transformer as claimed in claim 1, wherein there are "n" number of said adding-subtracting means; and wherein the memory means carries out reading and writing "n" times.

6. The Hadamard transformer as claimed in claim 1, wherein said memory addresses corresponding to the plurality of said adding-subtracting means are assigned by said memory address generating means.

7. The Hadamard transformer as claimed in claim 1, wherein said memory means has a size proportional to a size of an inputted Hadamard function sequence.

8. The Hadamard transformer as claimed in claim 1 wherein said plurality of adding-subtracting means are connected to each other in series.

9. A Hadamard transformer using memory cells for use in a digital signal processor for restoring to original signals at a receiving end from signals transformed to a Hadamard function sequence at a transmitting end, the Hadamard transformer comprising:

a counting means for receiving sample data clocks to output counted signals to a memory address generating means and to a plurality of adding-subtracting means;

the plurality of said adding-subtracting means for adding and subtracting the input signals and the data read from a memory means in accordance with counted signals of said counting means so as to record results into said memory means;

a plurality of transforming means each comprised of a comparing means for comparing final output values of said adding-subtracting means at each period of the Hadamard function sequence so as to detect a maximum likelihood Hadamard function sequence;

said memory means for storing a plurality of data inputted and outputted to and from the plurality of said adding-subtracting means; and said memory address generating means for generating memory addresses in accordance with a sample data clock and in accordance with the counted signals of said counting means so as to make it possible to record and read to and from said memory means.

10. The Hadamard transformer as claimed in claim 9, wherein said adding-subtracting section comprises:

a first switching section for selectively recording into the memory device a subtracted output data or a data inputted in accordance with output signals of said counting means;

a second switching section for selectively outputting to a dividing section a data read from said memory means or a data of the memory means plus an input data in accordance with counted output signals of said counting means;

an adding section for adding up an inputted data and a data read from said memory means so as to output results to said second switching section;

a subtracting section for subtracting an inputted data from a data read from said memory means to output results to said first switching section; and a dividing section for dividing output values of said second switching section so as to adjust the number of digits of an effective data during a digital signal processing.

11. The Hadamard transformer as claimed in claim 9, wherein said comparing means compares outputs of the plurality of said adding-subtracting means by delaying a clock.

12. The Hadamard transformer as claimed in claim 9, wherein, in said memory means, output data of the plurality of said adding-subtracting means are sequentially stored into addresses of said memory means for a predetermined period of time.

13. The Hadamard transformer as claimed in claim 9, wherein said memory means carries out reading and writing correspondingly with the number of said adding-subtracting means.

14. The Hadamard transformer as claimed in claim 9, wherein said memory addresses corresponding to the plurality of said adding-subtracting means are assigned by said memory address generating means.

15. The Hadamard transformer as claimed in claim 9, wherein said memory means has a size proportional to a size of an inputted Hadamard function sequence.

16. The Hadamard transformer as claimed in claim 9, wherein said memory means is composed of a RAM capable of reading and writing.

17. The Hadamard transformer as claimed in claim 9 wherein said plurality of adding-subtracting means are connected to each other in series.

* * * * *